United States Patent [19]
Langton et al.

[11] 4,274,881
[45] Jun. 23, 1981

[54] HIGH TEMPERATURE CEMENT

[76] Inventors: Christine A. Langton, 523 S. Atherton St.; Della M. Roy, 528 S. Pugh St., both of State College, Pa. 16801

[21] Appl. No.: 111,644

[22] Filed: Jan. 14, 1980

[51] Int. Cl.$^3$ .............................................. C04B 7/02
[52] U.S. Cl. ..................................... 106/98; 106/99
[58] Field of Search ........................... 106/99, 98, 120

[56] References Cited

U.S. PATENT DOCUMENTS

| | | | |
|---|---|---|---|
| 926,820 | 7/1909 | Norton | 106/99 |
| 1,672,293 | 6/1928 | Allison | 106/98 |
| 1,968,489 | 7/1934 | Jenkins | 106/98 |
| 2,084,354 | 6/1937 | Morbelli | 106/98 |
| 2,176,862 | 10/1939 | Moreton | 106/98 |
| 2,227,790 | 1/1941 | Moreton | 106/98 |
| 2,237,258 | 4/1941 | Jacobs | 106/98 |
| 2,309,206 | 1/1943 | Newman | 106/98 |
| 2,356,214 | 8/1944 | Casciani | 106/98 |
| 2,880,101 | 3/1959 | Ulfstedt | 106/87 |
| 3,582,277 | 6/1971 | Hays et al. | 106/98 |
| 3,880,664 | 4/1975 | Schulze | 106/98 |
| 3,933,515 | 1/1976 | Yang | 106/99 |
| 4,046,583 | 9/1977 | Collepardi | 106/90 |

OTHER PUBLICATIONS

Langton et al., High Temperature Cements with Geothermal Applications, Bull. of Congress International de la Chemie des Cements.
Langton et al., Soc. of Pet. Engrs., Bull. of 1929, Spe International Symp. on Oilfield and Geothermal Chemistry, paper No. 7877.
New High Temperature Cementing Material for Geothermal Wells: Stability and Properties, Final Report; Quarterly Report for the Period Dec. 1, 1978 to Feb. 28, 1979.
Cementing of Geothermal Wells, Progress Report No. 10 and No. 11.
Slaughter et al., Amer. J. of Sci., 275, 143 (1975).
Eilers et al., Soc. of Pet. Engrs. of AIME, Paper No. Spe 5871.
Kalousek, Research on Cements for Geothermal and Deep Oil Wells, Soc. of Pet. Engrs. of AIME, Paper No. Spe 5940.
Ostroot et al., Cementing Geothermal Steam Wells, Soc. of Pet. Engrs. of AIME, Paper No. Spe 904.
Hemley et al., Am. J. of Sci. 277, 322 (1977).
Midgley, Cement and Concrete Research, 91, 157, (1979).
Maravilla, J. Pet. Tech., 1087 (1974).
Petrovic, The System $C_2O-MgO-SiO_2-H_2O$ from 150°–350° C. under Hydrothermal Conditions, Silikaty, 17(4), 311 (1973).

*Primary Examiner*—James Poer
*Attorney, Agent, or Firm*—Oblon, Fisher, Spivak, McClelland & Maier

[57] ABSTRACT

A high temperature, curable cement which is characterized in the cured state by a hydrothermally crystallized phase of diopside and/or serpentine.

16 Claims, 9 Drawing Figures

HIGH TEMPERATURE CEMENT

BACKGROUND OF THE INVENTION

1. Field of the Invention

This invention relates generally to high temperature cements and more particularly to hydrothermal cements containing a diopside or serpentine phase.

2. Description of the Prior Art

Hydrothermal curing refers to treatment of cement at elevated temperatures and pressures (i.e., above ambient) in the presence of water. Hydrothermally cured cements designed especially for use in oil and gas wells have heretofore been operable at temperatures up to about 320° C. at a pressure of 20,000 psi.

Most hydrothermal cements are calcium silicate based cements, such as portland cement. The most important components of these cements are belite (dicalcium silicate, $C_2S$) and alite (tricalcium silicate, $C_3S$). When cured hydrothermally, $C_2S$ and $C_3S$ present in these cements react to form various semicrystalline and crystalline calcium silicates and calcium silicate hydrates, the structures of which depend on temperature and pressure. Typical of the hydrates which form are $\alpha$-$C_2SH$, $\beta$-$C_2SH$ (hillebrandite) and $C_5S_2H$ (calciochrondite).

When extra silica is added to cements containing $C_2S$ and $C_3S$, CS (wollastonite) and various calcium silicate hydrates are formed depending on the stoichiometric composition of the starting materials and the curing temperature and pressure used. Typical of these latter hydrates are foshagite, $(Ca_4Si_3O_9(OH)_2)$ xonotlite, $(Ca_6Si_6O_{17}(OH)_2)$ tobermorite, $(Ca_5(Si_6O_{18}H_2.4H_2O))$ and truscottite $(Ca_6Si_{10}O_{24}(OH)_2)$. These compounds may undergo further changes with time such as conversion to more stable phases.

Hydrothermal cements are often used in wells to bind steel casings to the wall rock of bore-holes, to seal porous formations, and to plug wells in order to prevent contamination of the environment and migration and loss of valuable resources.

Cements used in deep oil and hydrothermal wells must meet stringent requirements of liquid and gas permeabilities, stability, strength, setting time and pumpability due to the conditions of high temperature, high pressure and the highly corrosive environment existing in such wells. The calcium silicate-based hydrothermal cements heretofore used, however, have not proven to be completely satisfactory in that they tend to deteriorate in the geothermal environments found in hot, corrosive wells, often causing thereby failure of the wells. While it is not completely known why this deterioration occurs, it is usually attributed to such factors as unacceptably high porosity and permeability, structural failure due to phase changes in the cement, or fracture induced by thermal shock at high temperatures. Thus, calcium silicate-based cements, which will more satisfactorily meet the stringent requirements necessary for use in very deep oil wells or in hydrothermal wells, would be quite advantageous.

Attempts have been made to modify calcium silicate-based cements, such as portland cement, in order to improve their properties. One such attempt has been to add magnesia or another magnesium source, such as serpentine, to the portland cement. Serpentine, $Mg_3Si_2O_5(OH)_4$, occurs in three polymorphs: chrysotile (i.e., asbestos), antigorite and lizardite. Each polymorph contains numerous polytypes.

One such modification of portland type cements, described in Ulfstadt, U.S. Pat. No. 2,880,101, Hayes, U.S. Pat. No. 3,582,277 and Collepardi, U.S. Pat. No. 4,046,583, is the addition of magnesia, followed by curing at temperatures up to about 200° C. Under the conditions as described in these prior art references, the magnesia does not react with the portland cement, but is merely slaked according to the reaction $MgO+H_2O=Mg(OH)_2$ to cause swelling. Excess unreacted magnesia is undesirable in well cement since the above reaction may cause uncontrollable expansion and consequent disruption of the cement structure.

Moreover, the addition of water to cement containing magnesia results in a slurry of too high a viscosity and, consequently, reduced pumpability, which limits the range of applicability of such cements. While the high viscosity can be overcome by addition of large amounts of water to the slurry, excess water has an undesirable effect on the setting, curing and physical properties of the cement.

It is also known to add asbestos fibers to cement followed by heating the mixture to temperatures up to 200° C. Under these conditions, the asbestos is not calcined and remains as serpentine in fibrous form. An example of this type of asbestos modified cement is described in Schulze, U.S. Pat. No. 3,880,664. Asbestos fibers do not readily react with compounds found in portland cement when cured hydrothermally between 200° and 440° C. and pressures up to 30,000 psi. Slurries containing asbestos fibers also require very high water to solids ratios. Therefore, formulations prepared for deep well cementing can only tolerate small amounts of asbestos fibers and still maintain acceptable workability (viscosity and pumpability). In addition, the presence of more than about 2% asbestos fibers in cement causes a reduction in compressive strength.

An attempt has also been made to make a hydraulic cement using only calcined serpentine rock. The cement obtained, however, was found to have low compressive strength following curing at 18° C. and, therefore, to be of only slight commercial value. (H. G. Midgley, Cement and Concrete Research, 9, 157 (1979)).

In April 1976, the ERDA Division of Geothermal Energy initiated a program for the development of improved cements specifically designed for geothermal well applications. The motivation for the program stems from an assessment that the cements currently used deteriorate in the geothermal environments, and that the life expectancy of a geothermal well and, therefore, the economics of geothermal power can be improved significantly if better materials are developed.

The cements used to complete geothermal wells are similar to those used in oil and gas wells. These materials deteriorate in geothermal environments and the failure of several wells has been attributed to cement degradation. Total loss of a well can result in a loss of up to $1,000,000. A partial well failure due to inadequate cement can result in an energy production decline or environmental damage. Thus, a real economic need exists for the development of improved cementing materials.

For use in geothermal wells, cementing materials with the following characteristics are needed:

1. Twenty-four hour compressive strength of at least 1000 psi.

2. Water permeability less than 0.1 millidarcy.
3. Cement/steel bond strength of at least 10 psi.
4. Stability for at least 96 days in hydrothermal water or 20% brine (i.e., no significant reduction in strength or increase in permeability after exposure at 400° C.).
5. Non-corrosive to steel.
6. Set time of 0.5–6 hour.

SUMMARY OF THE INVENTION

It is therefore, an object of the present invention to provide a cement which has the strength, stability, pumpability and setting time for applications requiring a high temperature hydrothermal cement, such as deep oil and geothermal wells.

It is also an object of the present invention to provide a cement that meets or exceeds the following criteria:
1. Twenty-four hour compressive strength of at least 100 psi.
2. Water permeability less than 0.1 millidarcy.
3. Cement/steel bond strength of at least 10 psi.
4. Stability for at least 96 days in hydrothermal water or 20% brine.
5. Non-corrosive to steel.
6. Set time of 0.5–6 hour.

It is a further object of the present invention to provide a di- and tricalcium silicate-based cement modified by a reactive form of magnesia and additional silica.

It is a further object of the present invention to provide a commercially acceptable cement from calcined serpentine containing a hydrothermally crystallized diopside or serpentine phase in the cured state.

It is a still further object of the present invention to provide a method for making a high temperature hydrothermal cement.

It is yet another object of the present invention to provide a method for curing a calcium silicate-based cement modified by the addition of reactive magnesia and silica.

These and other objects of the present invention as will be understood by the following description and drawings have been attained by providing a high temperature curable cement which is characterized in the cured state by a hydrothermally crystallized content of a diopside or serpentine phase. The cement, prior to curing, comprises calcined serpentine, fine grain silica of less than 50 μm particle size, and at least one of the phases responsible for hydration of portland cement clinker, especially dicalcium or tricalcium silicate.

The calcined serpentine, silica and calcium silicate are present in amounts sufficient to form at least one diopside and/or serpentine-containing phase when the cement is cured at temperatures of 120°–440° C. and a pressure of 30–30,000 psi. Depending on the composition of the cement as well as the temperature and pressure to which the cement is exposed, the curing time may be as short as one day or may take as long as 100 days or even longer, since, of course, curing is a continuous process.

DETAILED DESCRIPTION OF THE PREFERRED EMBODIMENTS

Figure 1:
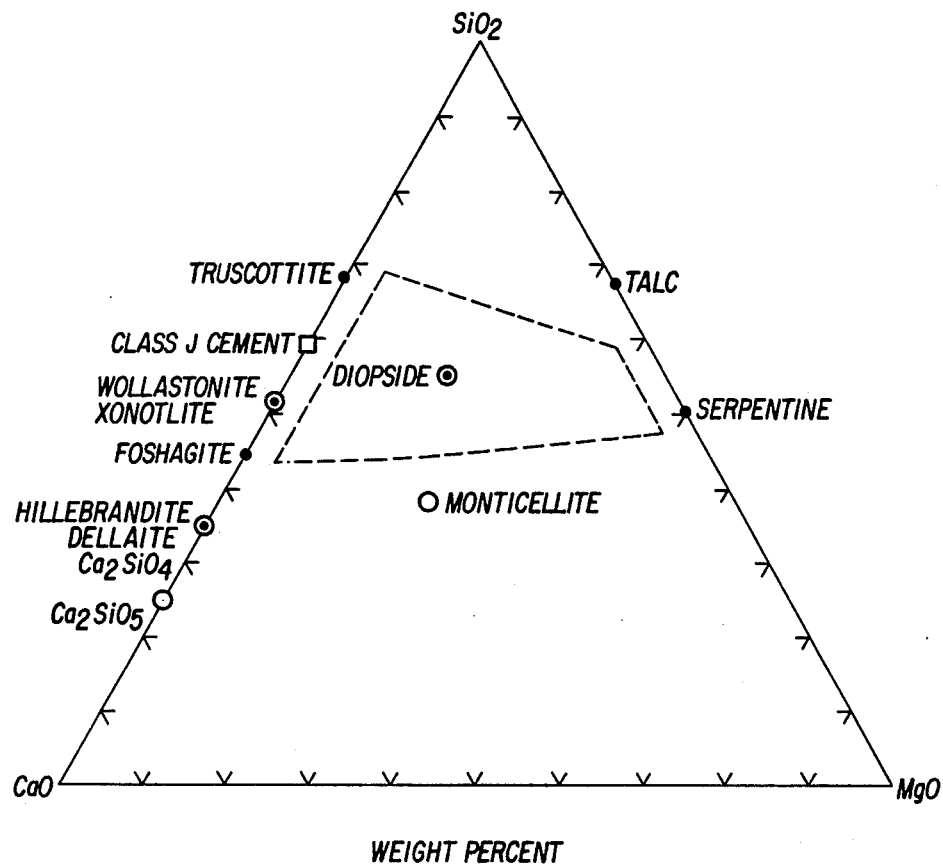
FIG. 1 is a ternary phase diagram showing a projection of some of the compositions of mixtures and compounds according to this invention in the system $CaO-MgO-SiO_2-H_2O$ onto the anhydrous join, $CaO-MgO-SiO_2$. The dotted line encompasses compositions which are especially desirable.
Figure 2:
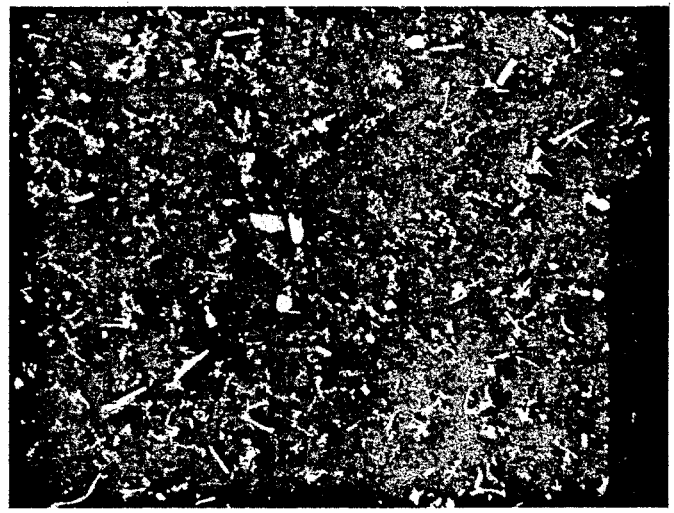
FIGS. 2 and 3 show calcined chrysotile serpentine (asbestos) as it appears after comminution. Particle size range is 0.3–150 μm with a mean value of 10 μm. Asbestos was calcined for 8 hours at 750° C. (100× and 1000×, respectively.)
Figure 3:

The new cement is a high temperature hydrothermally curable cement which is characterized in the cured state by the presence of a hydrothermally crystallized diopside- and/or serpentine-containing phase.

The diopside phase may occur per se in the cement or may occur in the form of co-existing phases such as calcium silicate-diopside, calcium silicate hydrate-diopside, diopside-serpentine or mixtures thereof. Likewise, the serpentine phase may occur per se in the cement or may occur in the form of co-existing phases such as calcium silicate-serpentine, calcium silicate hydrate-serpentine, or mixtures thereof.

A phase refers to discrete particles which have a definite composition and structure and which are separated from other phases by a physical boundary. The structure may be crystalline, semi-crystalline or amorphous.

The phases and combinations of co-existing phases of the present invention are crystallized as a result of the hydrothermal curing. Such hydrothermally crystallized phases and combinations of co-existing phases impart properties to cements which are different from the properties that would be imparted by ingredients which are merely added to cement and are not hydrothermally crystallized.

Some calcium silicates and calcium silicate hydrate phases which hydrothermally crystallize, and co-exist with the serpentine and/or diopside phases, are tobermorite $(Ca_5(Si_6O_{18}H_2).4H_2O)$, foshagite $(Ca_4Si_3O_9(OH)_2)$, xonotlite $(Ca_6Si_6O_{17}(OH)_2)$, truscottite $(Ca_6Si_{10}O_{24}(OH)_2)$, wollastonite $(CaSiO_3)$, hillebrandite $(Ca_2(SiO_3OH.2H_2O)$, afwillite $(Ca_3(SiO_3OH)_2.2H_2O)$, gyrolite $(Ca_4(Si_6O_{15})(OH)_2.3H_2O)$, reyerite $(K_nCa_{14}Si_{24}O_{60}(OH)_5.5H_2O)$ and 3.15 A phase.

These phases or combinations of co-existing phases have been surprisingly found to impart properties which make the cement particularly well suited for use under conditions of high temperatures, high pressures, and corrosive environments, such as occur in deep oil wells and in geothermal wells.

The new cements are made from calcined serpentine, fine grain silica, and di- or tricalcium silicate.

The cement is mixed with water and allowed to set and cure. The cement is cured hydrothermally at a temperature of 120° to 440° C., and at a pressure of 30 to 30,000 psi for at least one day. When the cement is used in wells, such as deep oil or geothermal wells, the cement is pumped or poured into the well where it sets and cures.

The di- and tricalcium silicate (belite and alite, $C_2S$ and $C_3S$, respectively) may be provided by use of portland cement, such as class G cement or a modified portland cement, or may be formed in situ from silica and calcium oxide. The di- or tricalcium silicate may also be formed by reacting mixtures of limestone and pure sandstone or other naturally occurring sources of pure silica, such as, diatomite, tripoli, or sand. These mixtures can tolerate limited amounts of other components, such as clays. Other industrial processes may produce calcium silicate phases as by-products. For example, $C_2S$ is formed during the recovery of lithium from spodumene according to the following reaction: $Li_2O.Al_2O_3.4SiO_2 + 8CaCO_3 = 2LiAlO_2 + 4C_2S + 8CO_2 \rightleftarrows$.

Belite, particularly $\beta\text{-}C_2S$, is especially desirable since it hydrates more slowly than $C_3S$. Therefore, class J oil well cement, a modified portland cement containing about 25% $SiO_2$ and 75% $\beta$-dicalcium silicate (without tricalcium silicate) is particularly preferred.

Class J cement often contains small amounts of calcium carbonate, which can be removed by heating the cement at temperatures above 820° C. In the present invention, decarbonation was carried out at temperatures around 1000° C.

If class J cement is not decarbonated, the cured cement often is found to contain a scawtite phase. Scawtite, which is similar in structure to xonotlite with some of the water molecules replaced by $CO_2$ molecules, is not found to have a deleterious effect on the properties of the cement.

The silica used in the new cement should be fine grained and have particle size of less than 50 μm, preferably less than 30 μm, and most preferably less than 10 μm. Silica may be comminuted separately or interground with other ingredients. The method of comminuting silica depends on the form in which it is added. However, in most cases, a ball mill is employed for comminution. The particle size of the silica should be selected so that the silica will react with the di- and tricalcium silicate and calcined serpentine within 48 hours, and preferably within 24 hours under the curing conditions.

Silica flour, such as 5 μm minusil, is one excellent source of silica. Other suitable sources of silica include volcanic matter, such as tuff, trass (ground-up tuff) and santorin; marine matter such as diatomite, tripoli powder, kieselguhr, and moler; artificial by-products of industrial processes such as silica dust, flue dust, ferrosilicon dust, fly ash, slag, slag wool and rice hull ash; and manufactured products such as perlite, silica brick and chamotte. Of course, any silica source would be suitable.

The serpentine used in the present invention may be any polytype of the three polymorphs of serpentine: chrysotile, antigorite or lizardite, or any combination of polymorphs. Chrysotile is especially preferred. It is only necessary that the serpentine be calcined prior to use.

During calcination, the serpentine is converted to an aggregate which will react with the silica and dicalcium or tricalcium silicate components when the cement is cured hydrothermally at 120°–440° C. and 30–30,000 psi. The calcined reaction aggregate contains one or more of forsterite, a polymorph of enstatite, or amorphous material.

The reaction products of serpentine calcination are a function of the calcination time and temperature as well as of the chemistry and mineralogy of the serpentine. The calcination time and temperature are selected so as to allow the serpentine to be dehydrated or substantially dehydroxylated in a conveniently short period of time in order to form the reactive aggregate.

Calcination usually occurs at temperatures of 450° to 950° C., and most commonly 750° to 800° C. Serpentine may be calcined at ambient pressure at a temperature above approximately 550° C. and at somewhat lower temperatures in vacuo. The calcination time period depends on the temperature used.

If the serpentine is not calcined, it will not react with the silica and $C_2S$ or $C_3S$ when cured under the hydrothermal conditions of the present invention. This is illustrated by contrast of FIG. 4 with FIG. 5.

Figure 4:
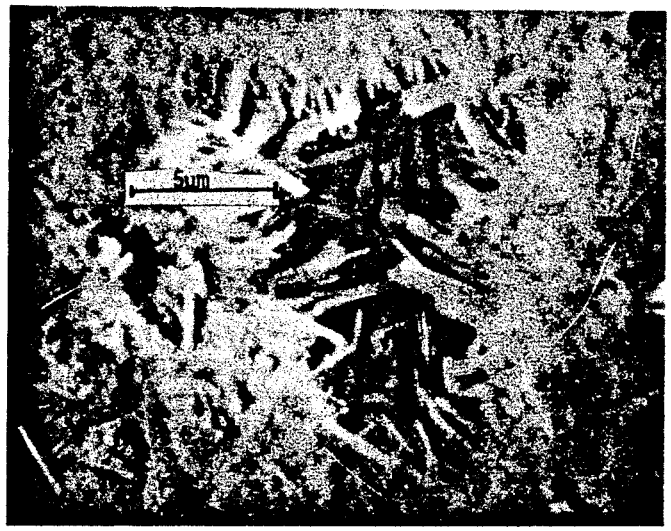
FIG. 4 shows diopside crystals formed as the result of hydrothermal curing (400° C., 10,000 psi) of the following cement formulation: 40 wt. % calcined serpentine +60 wt. % Class J oil well cement which was treated at 1000° C. for 2 hours to decarbonate any $CaCO_3$ present (3000× and 200×, respectively.)
Figure 5:
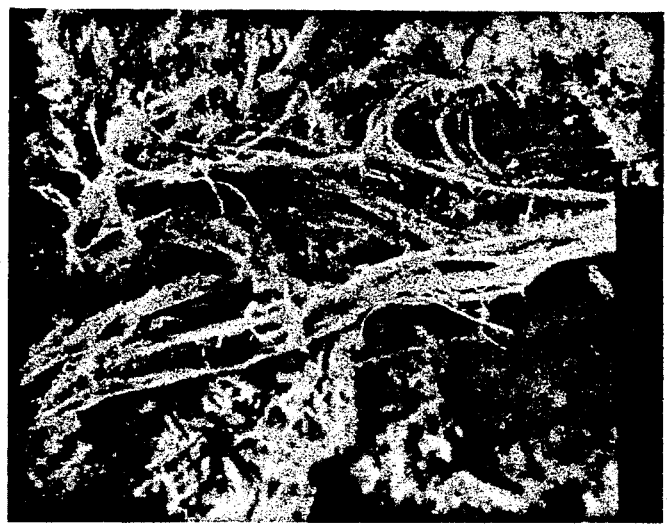
FIG. 5 shows large shredded fiber of unreacted asbestos embedded in calcium silicate hydrates formed when a mixture of 40 wt. % uncalcined fibrous serpentine asbestos and 60 wt. % Class J cement was hydrothermally cured at 400° C., 10,000 psi.

FIG. 4 shows the diopside which is formed when 40 wt. % calcined chrysotile is mixed with 60 wt. % class J cement and cured at 400° C. and 10,000 psi. FIG. 5 shows the unreacted fibers of serpentine chrysotile after 40 wt. % asbestos is mixed with 60 wt. % class J cement and cured at 400° C. and 10,000 psi.

The proportions of the calcined serpentine, silica and silicate are preferably selected so as to produce a mixture with major oxide components encompassed by a compositional region in the ternary system $CaO\text{-}MgO\text{-}SiO_2$ of FIG. 1, extending from about 45–65 wt. % $SiO_2$ along the $CaO\text{-}SiO_2$ join to about 45–55 wt. % $SiO_2$ along the $MgO\text{-}SiO_2$ join and containing not less than 5% wt. MgO or 5 wt. % CaO.

The solid components of the cement are mixed with water in order to form a slurry capable of being pumped down a well. The slurry may be prepared in a common oil well cementing type mixer, such as, a jet mixer, a recirculating mixer, a pneumatic batch mixer, or a ribbon batch mixer. Ordinarily, the dry ingredients are pre-blended while water soluble additives are dispersed with the mixing water. In addition, a rotary or pan mixer could be used for more routine cement processing.

The weight ratio of water to solid (w/s) in the slurry should be in the range of 0.2 to 1 and preferably 0.3 to 0.5.

In order for the present cement to have good workability for use in wells, it should be pumpable and have a set time of 0.5 to 48 hours, preferably 2 to 24 hours, and most preferably 2 to 12 hours.

In order to achieve this range of set times, it may be necessary to add set retarders or accellerators to the cementious mixture.

If the cement sets too quickly for good workability, a set retarder may be added. Set retarders that are particularly effective in the present invention are admixtures of boron containing hydroxy carboxylic acids or mixtures of borax and salts of lignosulfonic acid. Other set retarders that are effective in the present invention include calcium lignosulfates, carboxymethyl-hydroxyethylcellulose, salt (saturated), borax or the like.

If the set time of the cement is too slow, a set accellerator may be added. Suitable set accellerators useful in the present invention include calcium chloride, sodium chloride-calcium chloride mixtures, sodium silicate, sodium chloride (1–6%) and $CH_4Cl$-$CaCl_2$ blend.

Water reducers may also be added in order to disperse the cement adequately and to minimize the amount of water required for mixing and pumping. Some examples of water reducers which may be added to the present invention include sulfonated naphthalene-formalin condensates or sulfonated melamine-formalin condensates.

Defoamer admixtures are often added to mixing water to ensure uniform mixing and to minimize air entrapment and foaming caused during mixing. Plasticizers, extenders, weight materials, fluid loss additives and lost circulation additives may also be added. Set or slurry modifiers are usually dispersed in the mixing water prior to combination with cement or solids in order to ensure uniform distribution of the additives. There is, of course, no criticality in the order of mixing the cement and modifiers.

The cement is capable of being cured at a sufficiently rapid rate so that it has a compressive strength of 1000 psi after 24 hours. Furthermore, the cement shows no significant reduction in strength or increase in permeability after being exposed to hydrothermal water or 20% brine for 96 days at 400° C.

With the compositions and the curing conditions as above discussed, the cement contains a hydrothermally crystallized diopside and/or serpentine phase or one or more combinations of serpentine- and/or diopside-containing coexisting phases in amount sufficient to satisfy the following criteria:

1. Twenty-four hour compressive strength of at least 1000 psi.
2. Water permeability less than 0.1 millidarcy.
3. Cement/steel bond strength of at least 10 psi.
4. Stability for at least 96 days in hydrothermal water or 20% brine.
5. Non-corrosive to steel.
6. Set time of 0.5–6 hour.

Morphology and size of the crystalline or semicrystalline reaction products were both important for the cementitious quality of hydrothermally cured mixtures. The presence of fine needles, such as xonotlite; fibers, such as truscottite and foshagite; interlocking platelets, hexagonal anorthite; and intergrown needles such as diopside and pectolite, resulted in superior microhardness and compressive strength measurements. Cubic crystals such as analcite, grossular-hibschite (hydrogarnet series) and bicchulite, in addition to subhedral to euhedral grains of triclinic anorthite and monticellite, proved deleterious to the cementitious quality of hydrothermally cured mixtures.

Carbonation of free lime in some starting materials resulted in formation of scawtite below about 350° C. and calcite above 350° C. at 68.9 MPa. Values obtained to date for compressive strength and microhardness measurements indicate acceptable and even superior strengths for carbonate-containing cements.

Having generally described the invention, a more complete understanding can be obtained by reference to certain specific examples, which are provided herein for purposes of illustration only and are not intended to be limiting thereof unless otherwise specified.

EXAMPLES

Starting Materials.

Starting materials for phase relation studies included reagent grade oxides, gels, $\beta C_2S$, commercial portland cements, silica modifiers (silicic acid, 5 micrometer quartz, Tripoli, perlite, dehydrated silica gel), and a magnesia modifier (calcined chrysotile). X-ray analysis of the Class J oil well cement indicated the presence of $\beta C_2S$, quartz, and calcite.

Chrysotile serpentine was calcined at 800° C. for ten hours to produce a reactive mixture of very fine grained amorphous material, forsterite, and enstatite.

Hydrothermal Equipment and Sample Preparation.

Two types of autoclaves were used in synthesis studies: (1) Conventional 30 ml cold-seal Tuttle pressure vessels externally heated in Kanthal wound furnace assemblies; (2) 500 ml Inconel cold-seal vessels modified from the Barnes-Rocker Assembly and externally heated in Kanthal pot furnaces.

The samples were cured in conventional Tuttle pressure vessels. Starting materials, pastes or powders plus water, were placed in noble metal tubes and cured in an open system (tubes were not welded) or in a closed system (tubes were welded and weighed before and after curing to ensure containment). Phase relations were comparable for these preparation techniques which implies negligible ion transport.

Pastes or slurries were cast in 25×50 mm plastic molds and were allowed to set for 30 minutes to 24 hours at room temperature and greater than 95% relative humidity. Then they were removed from the molds and cured in the 500 cc autoclaves. Deionized water was the pressurizing medium in both types of autoclaves.

Curing Conditions.

Samples were cured at 200°, 250°, 300°, 350°, and 400° C. over the pressure range 6.9–68.9 MPa (1000–10,000 psi). Pressure had little effect on the run products crystallized. Most experiments were run at 68.9 MPa. Curing times varied from 24 hours to 98 days. Deionized water was used as the pressurizing medium.

Mineralogical Examination.

Mineralogical analyses were carried out by x-ray powder diffraction using $CuK_\alpha$ radiation. SEM images were used to describe morphologies of reaction products, and morphologies were then correlated with diffraction patterns. SEM imagery proved to be the most useful technique for identifying minor amounts of phases present.

Physical Property Measurements.

Microhardness testing was performed using a Leitz microhardness tester and the Vickers indentation method with a 40X objective. Samples were embedded in epoxy and polished to a one micrometer diamond paste finish. Microhardness measurements were used as an approximation of relative compressive strengths. Compressive strength measurements were made on a Tinius Olsen Testing Machine. Samples were sawed so the tops and bottoms were parallel before testing. Permeability measurements on the larger samples were made with pressurized (up to 5.5 MPa) nitrogen gas flowing through the samples by measuring the displacement of water by the flowing gas. Water permeability was measured using pressurized water (13.8 MPa) flowing through the sample. Viscometers were used to analyze the properties of fresh cement slurries. Both a Brookfield Rhelog model 5XHBT and a Haake Rotovisco RV-3 Viscometer were utilized.

| Ex.No. | Starting Material | Temp. (°C.) | Press. (MPa) | Time (days) | Reaction Products (as determined by x-ray diffraction) |
|---|---|---|---|---|---|
| 1 | 80 wt. % decarbonated Class J cement | 400 | 68.9 (10,000 | 10 | xonotlite + wollastonite + diopside |
|  | 20 wt. % calcined chrysotile | 350 | 68.9 psi) | 10 | xonotlite + diopside |
|  | deionized water; w/s = 0.45 | 300 | 68.9 | 10 | xonotlite + quartz + serpentine + poorly crystalline phases |
| 2 | 60 wt. % decarbonated Class J cement | 400 | 68.9 | 10 | diopside + wollastonite (minor) |
|  | 40 wt. % calcined chrysotile | 350 | 68.9 | 10 | diopside + xonotlite (minor) |
|  | deionized water; w/s = 0.45 | 300 | 68.9 | 10 | diopside + xonotlite + serpentine |
|  |  | 200 | 68.9 | 10 | xonotlite + serpentine + quartz |
| 3 | 40 wt. % decarbonated Class J cement | 400 | 68.9 | 10 | diopside + monticellite |
|  | 60 wt. % calcined chrysotile | 350 | 68.9 | 10 | diopside + xonotlite + serpentine |
|  | deionized water; w/s = 0.45 | 300-200 | 68.9 | 10 | xonotlite + serpentine |
| 4 | 20 wt. % decarbonated Class J cement | 400 | 68.9 | 10 | forsterite + serpentine + poorly crystalline phase |
|  | 80 wt. % calcined chrysotile |  |  |  | forsterite + serpentine + quartz |
|  | deionized water; w/s = 0.45 |  |  |  | (300° C. run contained primarily serpentine) |
| 5 | 60 wt. % decarbonated Class J cement | 400 | 68.9 | 10 | diopside + NaCl |
|  | 40 wt. % calcined chrysolite | 350 | 68.9 | 10 | diopside + xonotlite (minor) |
|  | saturated NaCl brine; w/s = 0.45 | 300-200 | 68.9 | 10 | xonotlite + serpentine + quartz |
| 6 | 60 wt. % Class J cement ($CO_2$ present) | 400-350 | 68.9 | 10 | diopside + calcite (minor) |
|  | 40 wt. % calcined chrysotile | 300 | 68.9 | 10 | diopside + scawtite |
|  | deionized water; w/s = 0.45 | 250-200 | 68.9 | 10 | serpentine + scawtite + quartz |
| 7 | 36 wt. % Class G oil well cement | 400 | 68.9 | 10 | diopside + wollastonite (minor) |
|  | 24 wt. % 5 μm Min-u-sil(quartz) | 350 | 68.9 | 10 | diopside + xonotlite |
|  | 40 wt. % calcined chrysotile | 300 | 68.9 | 10 | xonotlite + serpentine + m. quartz |
|  | deionized water; w/s = 0.5 | 250-180 | 68.9 | 10 | diopside |
|  |  |  |  |  | xonotlite + serpentine + quartz |
| 8 | 42 wt. % $\beta$-$C_2S$ | 400, 350 | " | " | diopside + truscottite |
|  | 18 wt. % Tripoli (amorphous silica) | 300 | " | " | truscottite + diopside + xontlite |
|  | 40 wt. % calcined chrysotile | 250-200 | " | " | truscottite + xontlite + serpentine |
|  | deionized water; w/s = 0.65 |  |  |  |  |

| Ex. No. | Wt. % Alkali (in Mixing Water) w/s = .6 |  | $\beta$-$C_2S$ (wt. %) | 5 μm quartz (wt. %) | Calcined chrysotile (wt. %) | Curing Temp (°C.) | Curing Pressure (psi) | Curing Time (days) | Reaction Products |
|---|---|---|---|---|---|---|---|---|---|
| 9 | NaOH | 0.5% | 40 | 20 | 40 | 400-200 | 10,000 | 10 | diopside |
|  | NaOH | 2.0% | 39.3 | 19.6 | 39.3 | 400-200 | 10,000 | 10 | diopside |
|  | NaOH | 10% | 36 | 18 | 36 | 400-200 | 10,000 | 10 | diopside + pectolite (minor) |
|  | KOH | 0.5% | 40 | 20 | 40 | 400-300 | 10,000 | 10 | diopside |
|  | KOH | 0.5% | 40 | 20 | 40 | 250-200 | 10,000 | 10 | diopside + tobermorite |
|  | KOH | 2.0% | 39.3 | 19.6 | 39.3 | 400-250 | 10,000 | 10 | diopside |
|  | KOH | 2.0% | 39.3 | 19.6 | 39.3 | 200 | 10,000 | 10 | diopside + tobermorite |
|  | KOH | 10% | 36 | 18 | 36 | 400-300 | 10,000 | 10 | diopside |
|  |  |  |  |  |  | 250-200 | 10,000 | 10 | diopside + tobermorite |

| Ex. No. | Starting Material | Temp. (°C.) | Press. (MPa) | Time (days) | Reaction Products (determined by x-ray diffraction) |
|---|---|---|---|---|---|
| 10 | 100 wt. % calcined chrysotile | 400 | 68.9 (10,00 psi) | 5 | forsterite + serpentine (minor) |
|  | deionized water; w/s = 1.0 | 300 | 68.9 (10,00 psi) | " | serpentine + forsterite |
|  |  | 200 | 68.9 (10,00 psi) | " | forsterite + serpentine + qtz (minor) |
| 11 | 100 wt. % calcined chrysotile (no water) | 25 |  |  | forsterite + enstatite + quartz |
| 12 | 100 wt. % serpentine asbestos fiber (no water) | 25 |  |  | serpentine polymorphs (chrysotile predominantly) |
| 13 | 60 wt. % decarbonated Class J cement | 400 | 68.9 | 5 & 20 | unreacted chrysotile asbestos xonotlite + wollastonite |
|  | 40 wt. % asbestos fiber | 200 |  |  | & other Ca-silicate hydrates |
|  | w/s = .6 |  |  |  |  |

| Ex. | Curing Time (days) | Temp. (°C.) | Press. (MPa) | Starting Material | Reaction Products | Compressive Strength (kg/$cm^2$) | Microhardness (kg/$mm^2$) | Bond Strength | Permeability (darcys) |
|---|---|---|---|---|---|---|---|---|---|
| 14 | 206 | 400 | 68.9 (10,000 psi) | 60 wt. % decarbonated Class J cement 40 wt. % calcined chrysotile w/s = 0.45 (distilled $H_2O$) | diopside | 14,205 psi | 21.12 (±1.32) | 90 psi | samples fractured during test because sample was very impermeable and to obtain readings too much pressure caused fracture. |
| 15 | 10 | 236 | 68.9 | 60 wt. % decarbonated Class J cement 40 wt. % calcined chrysotile w/s = 0.39 (20% brine solution) | serpentine scawtite fosterite |  | 18.47 (±1.08) | 1025 psi | Nitrogen = $8.0 \times 10^{-9}$ (after 3 hr. drying) water = $1.0 \times 10^{-4}$ |

-continued

| Ex. | | | | | NaCl & others | | | | |
|---|---|---|---|---|---|---|---|---|---|
| 8 | 300 (5,600 psi) | 38.6 | 60 wt. % Class J cement 40 wt. % calcined chrysotile w/s = 0.475 (distilled H$_2$O) | serpentine scawtite forsterite | 2,716 psi | — | 710 psi | samples fractured in permeability cell |
| | 400 | 38.6 | 60 wt. % Class J cement 40 wt. % calcined chrysotile w/s = 0.475 (distilled H$_2$O) | diopside chrysotile forsterite | 3,570 psi | — | 2278 psi | — |
| 7 | 400 | 38.6 | 50 wt. % decarbonated Class J cement 50 wt. % calcined chrysotile w/s = 0.475 | diopside chrysotile forsterite | 2,487 psi | — | 1887 psi | — |

Viscosity Data

| Ex. | Starting Material | Retarder (D-28) | Water (tap) | Temp. (°F.) | Set Time (Min.) |
|---|---|---|---|---|---|
| 16 | 480 g Class J oil well cement + 320 g calcined chrysotile | 2 grams | 385 ml | 300 | 51 |
| 17 | 480 g Class J oil well cement + 320 g calcined chrysotile | 6 grams | 385 ml | 300 | 381, still not set |
| 18 | 640 g Class J oil well cement + 160 g calcined chrysotile | 0 grams | 385 ml | 300 | 35 |
| 19 | 640 g Class J oil well cement + 160 g calcined chrysotile | 2 grams | 385 ml | 300 | 101 |
| 20 | 640 Class J oil well cement + 160 g asbestos (chrysotile) fibers | No amount of admixture would reduce viscosity of these mixtures to a pumpable level. | | | |
| 21 | 480 g Class J oil well cement 320 g asbestos (chrysotile) fibers | | | | |

Cements used in deep oil and hydrothermal wells may be exposed to salts such as brine, or K$_2$O, Na$_2$O, KOH or NaOH. These salts may be present as additives in the cement or may occur naturally in the well. A comparison of Examples 3 and 5 demonstrates that the presence of NaCl in the mixing water, even if present as a saturated brine, does not significantly affect the phases that hydrothermally crystallize.

Similarly, Example 9 demonstrates that the presence of varying quantities of KOH and NaOH in the mixing water does not significantly affect the phases that hydrothermally crystallize.

Example 15, in which the mixing water was a 20% brine solution, demonstrates a cement which meets the criteria of the present invention even though it was cured in the presence of brine.

Examples 16-19 illustrate the ability to adjust the set time of the present cements by means of a retarder. The retarder used in these experiments was D-28, sold by Dowell Division of Dow Chemical Co.

By comparison, the viscosity of a mixture of 640 grams of Class J oil well cement and 160 grams of asbestos fibers and a mixture of 480 grams of Class J oil well cement and 320 grams of asbestos fibers could not be reduced to pumpable levels by the addition of D-28 retarder.

In Example 10, calcined chrysotile was used alone and cured at 200° C., 300° C. and 400° C. to make a cement which satisfied the criteria of the present invention. Contrary to the teaching of Midgley, Cement and Concrete Research, 9, 157 (1979), therefore, calcined chrysotile alone can be made into an effective cement. It has now been unexpectedly found that a hydrothermal well cement can be produced by curing a slurry containing calcined serpentine at elevated temperatures.

Figure 6:
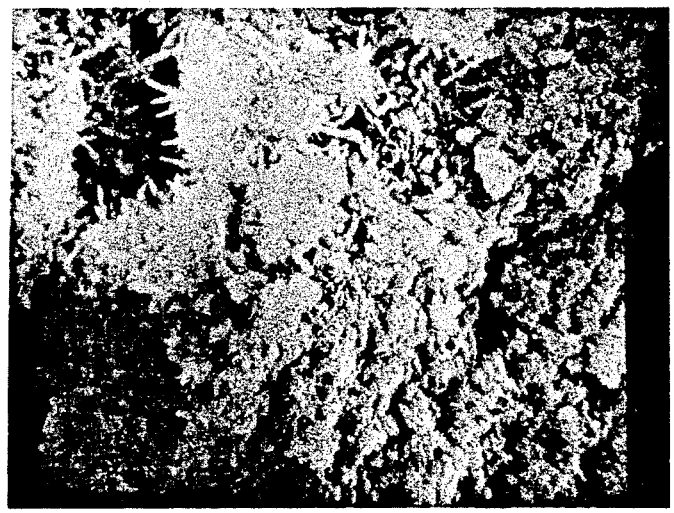
FIGS. 6 and 7 show the morphology of calcined chrysotile serpentine (asbestos) alone, hydrothermally cured at 300° C., 10,000 psi. x-Ray analysis indicated a partial reaction of forsterite and enstatite to form serpentine after 5 days. (3000× and 10,000×, respectively.)
Figure 7:
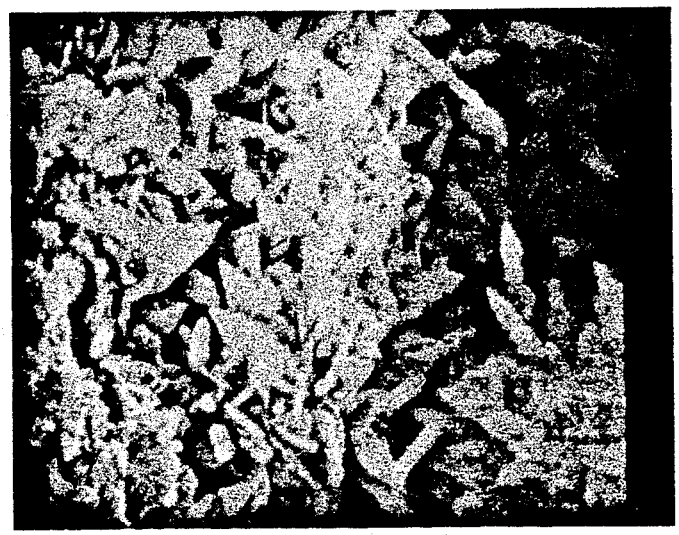
Figure 8:
FIGS. 8 and 9 show the morphology of reaction products formed from a hydrothermally cured (300° C., 10,000 psi, 5 days) mixture of 40 wt. % calcined chrysotile serpentine (asbestos) containing forsterite, enstatite and quartz, and 60 wt. % decarbonated Class J cement. (1500× and 3000×, respectively.) The large needles shown in the central portion of FIG. 8 are calcium silicate hydrates. The more dense areas in FIG. 8 and magnified in FIG. 9 are magnesium silicate hydrates. A higher magnification of this magnesium containing material is similar to that shown in FIG. 7.
Figure 9:
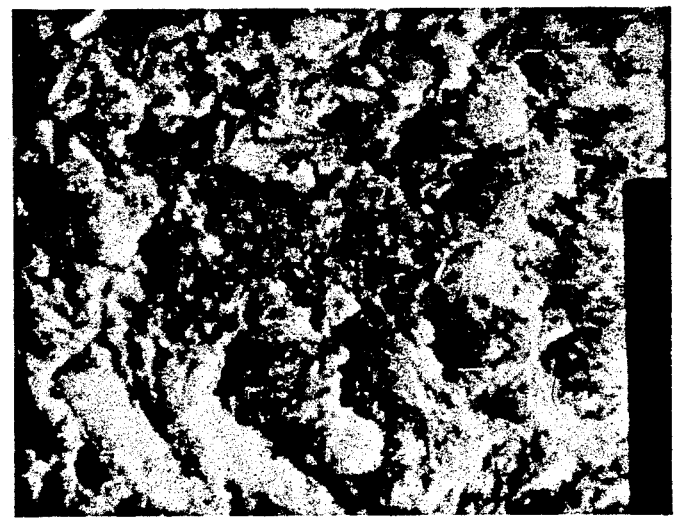

FIG. 6 shows the serpentine phase formed as a result of hydrothermally curing calcined chrysotile.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A high temperature, curable cement suitable for use in deep wells comprising:
   serpentine which has been calcined sufficiently to form an aggregate reactive in the presence of calcium silicate and silica under hydrothermal curing conditions, said reactive matter comprising at least one of forsterite, enstatite or amorphous material;
   fine grain silica of less than about 50 μm particle size; and
   at least one of dicalcium or tricalcium silicate
   wherein said calcined serpentine, silica and silicate are present in amounts sufficient to form a hydrothermally crystallized diopside phase when said cement is cured at a temperature of 120° to 440° C. and a pressure of 30 to 30,000 psi for at least one day, said cement containing no more than 2% asbestos fibers.

2. The cement of claim 1, wherein said hydrothermally cured phase is present in said cement in an amount sufficient to impart to said cement:
   a. twenty-four hour compressive strength of at least 1000 psi;
   b. water permeability less than 0.1 millidarcy;
   c. cement/steel bond strength of at least 10 psi;
   d. stability for at least 96 days in hydrothermal water or 20% brine;
   e. non-corrosive to steel;
   f. set time of 0.5 to 48 hours.

3. The cement of claim 1, wherein said serpentine is calcined at a temperature of at least 450° C. for at least 0.5 hour.

4. The cement of claim 1, wherein said forsterite, enstatite and amorphous material are finely comminuted before use.

5. The cement of claim 1, wherein said serpentine is chrysotile.

6. The cement of claim 1, wherein the silica is silica flour.

7. The cement of claim 1, wherein the source of the silica is at least one of tuff, trass, santorin, diatomite, tripoli powder, kieselguhr, moler, silica dust, flue dust, fly ash, slag, slag wool, rice hull ash, perlite, silica brick, chamotte, ferrosilicon dust or fine sand.

8. The cement of claim 1, wherein the di- or tricalcium silicate is portland cement.

9. The cement of claim 1, wherein the calcium silicate is at least one of silica-modified portland cement or Class J oil well cement.

10. The cement of claim 1, wherein said di- or tricalcium silicate is formed in situ by reaction of at least one of calcium oxide or limestone with silica.

11. A method for producing a high temperature, curable cement which in the cured state contains a hydrothermally crystallized phase of diopside, which comprises:
   forming an aqueous slurry of calcined serpentine, fine grain silica of a grain size of less than 50 μm, and at least one of dicalcium silicate or tricalcium silicate; and
   heating said slurry to a temperature of 120°–440° C. and a pressure of 30–30,000 psi for a period of at least one day.

12. The method of claim 11, wherein said slurry is formed by mixing 0.2 to 1.0 parts by weight of water per part by weight of said calcined serpentine, silica and silicate.

13. The method of claim 11, wherein said serpentine is chrysotile.

14. The method of claim 11, wherein the silica is silica flour.

15. The method of claim 11, wherein the di- or tricalcium silicate is portland cement.

16. The method of claim 11, wherein the dicalcium silicate is Class J oil well cement.

* * * * *